United States Patent
Fyten et al.

(10) Patent No.: US 7,303,015 B2
(45) Date of Patent: Dec. 4, 2007

(54) CEMENTITIOUS COMPOSITIONS CONTAINING INTERGROUND CEMENT CLINKER AND ZEOLITE

(75) Inventors: Glen C. Fyten, Red Deer (CA); Karen Luke, Duncan, OK (US); Keith A. Rispler, Red Deer (CA)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/594,435

(22) Filed: Nov. 8, 2006

(65) Prior Publication Data

US 2007/0051515 A1   Mar. 8, 2007

Related U.S. Application Data

(62) Division of application No. 10/939,902, filed on Sep. 13, 2004, now Pat. No. 7,182,137.

(51) Int. Cl.
*E21B 33/138* (2006.01)
*C04B 14/04* (2006.01)

(52) U.S. Cl. .............. 166/293; 106/680; 106/695; 106/715; 106/735; 166/292; 166/309

(58) Field of Classification Search .......... 166/285, 166/292, 293, 309; 106/672, 679, 680, 692, 106/693, 695, 709, 713, 715, 735
See application file for complete search history.

(56) References Cited

U.S. PATENT DOCUMENTS

| | | | |
|---|---|---|---|
| 1,943,584 A | 1/1934 | Cross | 252/6 |
| 2,094,316 A | 9/1937 | Cross | 255/1 |
| 2,131,338 A | 9/1938 | Vail | 61/36 |
| 2,349,049 A | 5/1944 | Means | 252/8.5 |
| 2,727,001 A | 12/1955 | Rowe | 252/8.5 |
| 2,848,051 A | 8/1958 | Williams | 166/28 |
| 3,047,493 A | 7/1962 | Rosenberg | 252/8.5 |
| 3,065,170 A | 11/1962 | Dumbauld et al. | 252/8.5 |
| 3,179,528 A | 4/1965 | Holmgreen et al. | 106/90 |
| 3,293,040 A | 12/1966 | Shaler, Jr. et al. | 99/48 |
| 3,694,152 A | 9/1972 | Sersale eet al. | 423/329 |
| 3,781,225 A | 12/1973 | Schwartz | 252/455 Z |
| 3,884,302 A | 5/1975 | Messenger | 166/291 |
| 3,887,385 A | 6/1975 | Quist et al. | 106/96 |
| 3,888,998 A | 6/1975 | Sampson et al. | 426/67 |

(Continued)

FOREIGN PATENT DOCUMENTS

CA   2153372   1/1996

(Continued)

OTHER PUBLICATIONS

Fyten, Glen et al., "Cementitious Compositions Containing Interground Cement Clinker and Zeolite" filed Nov. 8, 2006 as U.S. Appl. No. 11/594,430.

(Continued)

*Primary Examiner*—George Suchfield
(74) *Attorney, Agent, or Firm*—Craig W. Roddy; Haynes and Boone, LLP

(57) ABSTRACT

Methods and compositions for wellbore treating fluids, especially cementitious compositions that include interground cement clinker and zeolite, with and without gypsum.

24 Claims, 8 Drawing Sheets

U.S. PATENT DOCUMENTS

| | | | | |
|---|---|---|---|---|
| 3,963,508 | A * | 6/1976 | Masaryk | 106/693 |
| 4,054,462 | A | 10/1977 | Stude | 106/90 |
| 4,311,607 | A | 1/1982 | Kaeser | 252/140 |
| 4,363,736 | A | 12/1982 | Blcok | 252/8.5 A |
| 4,368,134 | A | 1/1983 | Kaeser | 252/140 |
| 4,372,876 | A | 2/1983 | Kulprathipanja et al. | 252/430 |
| 4,435,216 | A | 3/1984 | Diehl et al. | 106/97 |
| 4,468,334 | A | 8/1984 | Cox et al. | 252/8.5 C |
| 4,474,667 | A | 10/1984 | Block | 252/8.5 A |
| 4,482,379 | A | 11/1984 | Dibrell et al. | 106/76 |
| 4,548,734 | A | 10/1985 | Chaux et al. | 252/311 |
| 4,552,591 | A | 11/1985 | Millar | 106/18.33 |
| 4,632,186 | A | 12/1986 | Boncan et al. | 166/293 |
| 4,650,593 | A | 3/1987 | Slingerland | 252/8.5 |
| 4,772,307 | A | 9/1988 | Kiss et al. | 71/13 |
| 4,784,693 | A | 11/1988 | Kirkland et al. | 106/93 |
| 4,888,120 | A | 12/1989 | Mueller et al. | 252/8.551 |
| 4,943,544 | A | 7/1990 | McGarry et al. | 501/124 |
| 4,986,989 | A | 1/1991 | Sirosita et al. | 424/635 |
| 5,346,012 | A | 9/1994 | Heathman et al. | 166/293 |
| 5,383,967 | A | 1/1995 | Chase | 106/737 |
| 5,435,846 | A | 7/1995 | Tatematsu et al. | 106/813 |
| 5,494,513 | A | 2/1996 | Ding et al. | 106/672 |
| 5,527,387 | A | 6/1996 | Anderson et al. | 106/693 |
| 5,529,624 | A | 6/1996 | Riegler | 106/675 |
| 5,588,489 | A | 12/1996 | Chatterji et al. | 166/293 |
| 5,626,665 | A | 5/1997 | Barger et al. | 106/706 |
| 5,658,624 | A | 8/1997 | Anderson et al. | 428/34.7 |
| 5,711,383 | A | 1/1998 | Terry et al. | 175/72 |
| 5,788,762 | A | 8/1998 | Barger et al. | 106/706 |
| 5,807,810 | A | 9/1998 | Blezard et al. | 507/103 |
| 6,138,759 | A | 10/2000 | Chatterji et al. | 166/293 |
| 6,145,591 | A | 11/2000 | Boncan et al. | 106/291 |
| 6,149,724 | A * | 11/2000 | Ulibarri et al. | 106/693 |
| 6,170,575 | B1 | 1/2001 | Reddy et al. | 166/293 |
| 6,182,758 | B1 | 2/2001 | Vijn | 166/293 |
| 6,230,804 | B1 | 5/2001 | Mueller et al. | 166/293 |
| 6,245,142 | B1 | 6/2001 | Reddy et al. | 106/724 |
| 6,372,694 | B1 | 4/2002 | Osinga et al. | 507/140 |
| 6,379,456 | B1 | 4/2002 | Heathman et al. | 106/724 |
| 6,390,197 | B1 | 5/2002 | Maroy | 166/293 |
| 6,409,819 | B1 | 6/2002 | Ko | 106/707 |
| 6,457,524 | B1 | 10/2002 | Roddy | 166/293 |
| 6,475,275 | B1 | 11/2002 | Nebesnak et al. | 106/803 |
| 6,478,869 | B2 | 11/2002 | Reddy et al. | 106/724 |
| 6,494,951 | B1 | 12/2002 | Reddy et al. | 106/705 |
| 6,508,305 | B1 | 1/2003 | Brannon et al. | 166/293 |
| 6,565,647 | B1 | 5/2003 | Day et al. | 106/813 |
| 6,572,698 | B1 | 6/2003 | Ko | 106/772 |
| 6,610,139 | B2 | 8/2003 | Reddy et al. | 106/724 |
| 6,626,243 | B1 | 9/2003 | Boncan | 166/293 |
| 6,645,289 | B2 | 11/2003 | Sobolev et al. | 106/705 |
| 6,660,080 | B2 | 12/2003 | Reddy et al. | 106/724 |
| 6,713,553 | B2 | 3/2004 | Gonnon et al. | 524/552 |
| 6,722,434 | B2 | 4/2004 | Reddy et al. | 166/292 |
| 6,729,405 | B2 | 5/2004 | DiLullo et al. | 166/292 |
| 6,752,866 | B2 | 6/2004 | Gonnon et al. | 106/727 |
| 6,767,868 | B2 | 7/2004 | Dawson et al. | 507/236 |
| 6,832,652 | B1 | 12/2004 | Dillenbeck et al. | 166/293 |
| 6,840,319 | B1 | 1/2005 | Chatterji et al. | 166/293 |
| 6,840,996 | B2 | 1/2005 | Morioka et al. | 106/714 |
| 6,889,767 | B2 | 5/2005 | Reddy et al. | 166/293 |
| 6,964,302 | B2 * | 11/2005 | Luke et al. | 166/293 |
| 7,077,203 | B1 * | 7/2006 | Roddy et al. | 166/293 |
| 7,137,448 | B2 | 11/2006 | Arias et al. | 466/292 |
| 7,140,439 | B2 | 11/2006 | Luke et al. | |
| 7,182,137 | B2 | 2/2007 | Fyten et al. | |
| 7,219,733 | B2 * | 5/2007 | Luke et al. | 166/293 |
| 2002/0117090 | A1 | 8/2002 | Ku | 106/737 |
| 2003/0153466 | A1 | 8/2003 | Allen et al. | 504/358 |
| 2003/0203996 | A1 | 10/2003 | Gonnon et al. | 524/5 |
| 2004/0040475 | A1 * | 3/2004 | De La Roij | 106/819 |
| 2004/0083926 | A1 * | 5/2004 | Mitkova et al. | 106/38.27 |
| 2004/0107877 | A1 | 6/2004 | Getzlaf et al. | 106/813 |
| 2004/0108113 | A1 | 6/2004 | Luke et al. | 166/292 |
| 2004/0112600 | A1 | 6/2004 | Luke et al. | 166/295 |
| 2004/0188091 | A1 | 9/2004 | Luke et al. | 166/291 |
| 2004/0188092 | A1 | 9/2004 | Santra et al. | 166/291 |
| 2004/0244977 | A1 | 12/2004 | Luke et al. | 166/292 |
| 2004/0262000 | A1 | 12/2004 | Morgan et al. | 166/293 |
| 2004/0262001 | A1 | 12/2004 | Caveny et al. | 166/293 |
| 2005/0000734 | A1 | 1/2005 | Getzlaf et al. | 175/73 |
| 2005/0037864 | A1 | 2/2005 | Caveny et al. | 166/293 |
| 2005/0072599 | A1 | 4/2005 | Luke et al. | 175/66 |
| 2005/0133222 | A1 | 6/2005 | Arias et al. | 166/292 |
| 2006/0025312 | A1 | 2/2006 | Santra et al. | 507/269 |
| 2007/0051279 | A1 | 3/2007 | Fyten et al. | |
| 2007/0051515 | A1 | 3/2007 | Fyten et al. | |

FOREIGN PATENT DOCUMENTS

| | | | |
|---|---|---|---|
| EP | 1 428 805 A1 | 6/1974 | |
| EP | 0 802 253 A1 | 10/1997 | |
| EP | 0 895 971 A1 * | 2/1999 | |
| EP | 1004555 | 9/1999 | |
| EP | 1004556 | 9/1999 | |
| EP | 1 260 491 A1 | 11/2002 | |
| FR | 763998 | 11/1933 | |
| GB | 1469954 | 4/1977 | |
| GB | 2 353 523 A | 2/2001 | |
| JP | 61021947 A | 1/1986 | |
| JP | 07 003254 | 1/1995 | |
| WO | WO 98/554108 | 12/1998 | |
| WO | WO 01/70646 A1 | 9/2001 | |
| WO | WO 2005/059301 A1 | 6/2005 | |

OTHER PUBLICATIONS

Fyten, Glen et al., "Cementitious Compositions Containing Interground Cement Clinker and Zeolite" filed Nov. 8, 2006 as U.S. Appl. No. 11/594,326.

Office Action from U.S. Appl. No. 11/594,326 dated Feb. 26, 2007.

SPE 20624 entitled "Acidization of Analcime-Cementing Sandstone, Gulf Of Mexico", by D.R. Underdown et al., dated 1990.

SPE 29595 entitled "Designing a Remedial Acid Treatment for Gulf of Mexico Deepwater Turbidite Sands Containing Zeolite Cement", by B.A. Rogers et al., dated 1998.

Paper entitled "Tectonis, fluid migration, and fluid pressure in a Deformed forearc basin, Cook Inlet, Alaska", by R.L. Bruhn et al., pp. 550-563, dated 2000.

Paper entitled "Hydraulic Conductivity Measurement On Discrete Samples Collected From Leg 141, Site 863", by Kevin Brown, pp. 401-405, dated 1995.

Paper entitled "Alteration of Clay Minerals And Zeolites In Hydrothermal Brines", by Sridhar Komarneni et al., papes 383-391, dated 1983.

Paper entitled "A Non-Conventional Way of Developing Cement Slurry For Geothermal Wells", by V. Barlet-Gouedard et al., pp. 85-91, dated 2001.

Paper entitled "Portland-Zeolite-Cement For Minimizing Alkali-Aggregate Expansion", by R. Sersale, pp. 404-410, dated 1987.

Paper entitled "Zeolite Crystallization In Portland Cement Concrete Due To Alkali-Aggregate Reaction", by S.A. Marfil et al., pp. 1283-1288, dated 1993.

Paper entitled "A study on the hydration rate of natural zeoite blended Cement pastes", by C.S. Poon et al., pp. 427-432, dated 1999.

Paper entitled "Zeolite ceramsite cellular concrete", by N-Q. Feng pp. 117-122, dated 2000.

Paper entitled "Immobilization of caesium-loaded ion exchange resins in Zeolite-cement blends", by Sandor Bagosi et al., pp. 479-485, dated 1999.

Paper entitled "Effect of Bentonite and Zeolite on Durability of Cement Suspension under Sulfate Attack", by Ivan Janotka, pp. 710-715, dated 1988.

Paper entitled "Reuse of waste catalysts from petrochemical industries For cement substitution", by Nan Su et al., pp. 1773-1783, dated 2000.

Paper entitled "Extreme vertices design of concrete with combined Mineral admixtures", by Jian-Tong Ding et al., pp. 957-960, dated 1999.

Paper entitled "The Properties of Mortar Using Blends With Portland Cement Clinker, Zeolite Tuff and Gypsum", by Ivan Janotka, et al., pp. 105-110, dated 1995.

Paper entitled "Study on the suppression effect of natural zeolite on Expansion of concrete due to alkali-aggregate reaction", by Feng Naiqian et al., pp. 17-24, dated 1998.

Paper entitled "Comparative study of the initial surface absorption and Chloride diffusion of high performance zeolite, silica fume and PFA Concrete", by Sammy Y.N. Chan et al., pp. 293-300, dated 1999.

Paper entitled "A study on the hydration rate of natural zeolite Blended cement pastes", by C.S. Poon et al., pp. 427-432, dated 1999.

Japan Abstract No. J52117316 dated Oct. 1, 1977.

Japan abstract No. J10110487 dated Apr. 28, 1998.

Abstract No. SU1373781 dated Feb. 15, 1988.

Paper entitled "Zeolite P In Cements" Its Potential For Immobilizing. Toxic And Radioactive Waster Species by M Atkins et al., dated 1994.

Powder Diffraction File, PFD, Alphabetical Indexes for Experimental Patterns, Inorganic Phases, Sets 1-52, dated 2002.

International Center for Materials Technology Promotion, "Special Cements and Their Production Technology: CSA Series, Hydraulic Cement Series, Oil Well Cement Series etc: Hydraulic Engineering Cement", (2003).

Portland Cement Association, "Portland Cement, Concrete, and Heat of hydration", Concrete Technology Today, (1997), pp. 1-4, vol. 18, No. 2, Construction Information Services Department of the Portland Cement Association.

Application entitled "Zeolite-Containing Drilling Fluids", by Karen Luke et al., U.S. Appl. No. 11/544,691, filed Oct. 9, 2006.

Application entitled "Fluid Loss Additives for Cement Slurries" by Karen Luke et al., U.S. Appl. No. 11/545,392, filed Oct. 10, 2006.

Office action dated Aug. 2, 2006 from U.S. Appl. No. 10/939,902.

Answer 21 of 69 Chem Abstracts on STN DE 29825081 (Oct. 14, 2004) Dyckerhoff (one page abstract only).

Answer 30 of 69 Chem Abstracts on STN DE 19854477 (May 31, 2000) Mitkova (one page abstract only).

Answer 31 of 69 Chem Abstracts on STN DE 19854476 (May 31, 2000) Mitkova (one page abstract only).

* cited by examiner

CEMENTITIOUS COMPOSITIONS CONTAINING INTERGROUND CEMENT CLINKER AND ZEOLITE

CROSS REFERENCE TO RELATED APPLICATIONS

This application is a divisional and claims the benefit of U.S. patent application Ser. No. 10/939,902 filed Sep. 13, 2004 now U.S. Pat. No. 7,182,137, the disclosure of which is incorporated herein by reference.

BACKGROUND

The present application relates generally to compositions for sealing a subterranean zone penetrated by a wellbore.

Zeolites are known to be pozzolanic materials and may be activated with alkali or Portland cement in the presence of sufficient water. In most cases, it is possible to accelerate or retard the setting time by using conventional cement additives. However, further properties of a zeolite-containing composition such as compressive strength development, early strength, rheology, and density, for example, are of industrial concern.

Conventionally, a wellbore is drilled using a drilling fluid that is continuously circulated down a drill pipe, through a drill bit, and upwardly through the wellbore to the surface. The next operation usually involves running a pipe string, e.g., casing, into the wellbore, and then cleaning out the wellbore, after which primary cementing operations are typically performed. The pipe is cemented in the wellbore by placing a cement slurry in the annulus between the pipe and the walls of the wellbore. The cement slurry sets into a hard impermeable mass, and is intended to bond the pipe to the walls of the wellbore whereby the annulus is sealed and fluid communication between subterranean zones or to the surface by way of the annulus is prevented.

During any of the above or other operations performed in the wellbore, a number of problems can occur, including difficulty in removing portions of drilling fluid, deposits of filter cake, or inability to achieve a satisfactory bond between the pipe and the walls of the wellbore.

The present embodiments provide zeolite-containing cementitious compositions having enhanced performance in terms of rheological properties and compressive strength. In particular, such compositions are useful in the construction industry and in well cementing.

DESCRIPTION

Figure 1:
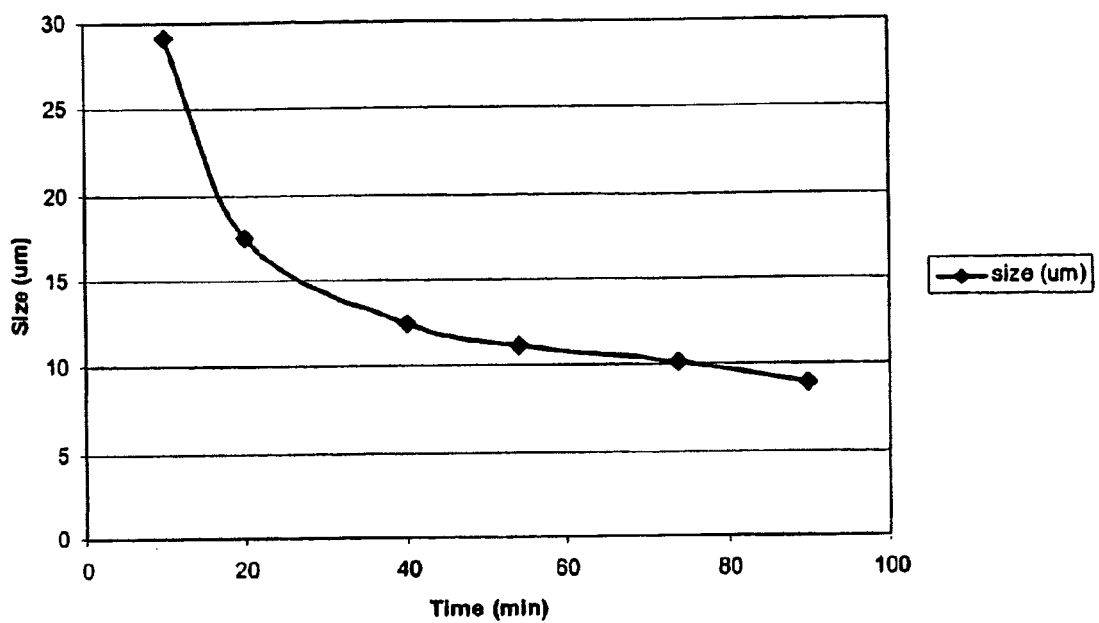
FIG. 1. is a graph of mean particle size as a function of grind time for a composition of 60% cement clinker interground with 40% zeolite (w/w)

Interground zeolite and cement clinker compositions are provided herein for use as a cementitious composition in cementing operations. Additional compositions are provided in which gypsum is interground with zeolite and cement clinker.

Intergrinding zeolite and cement clinker was found to provide a bimodal distribution of particle size in the grind, and increased strength properties of the subsequent cementitious set material as compared to blending separately-ground material, particularly at longer set times. The increased compressive strength of the interground set material was not observed when hand-ground gypsum was added to the slurry of interground clinker and zeolite material.

Class C cement is essentially ground clinker and gypsum, and slurries of such cement blended with zeolite, while producing early compressive strengths comparable to that of the interground material, does not provide later compressive strengths comparable to that of the interground material.

Increased flow, i.e., better rheology, was observed in those samples lacking gypsum. Gypsum serves the function of a retarder and in its absence, the aluminate phase hydration reactions appear to occur rapidly. Zeolite has a retarding effect also, however, zeolite appears to provide better results in terms of rheology.

The high compressive strengths at longer set times and the greater flow characteristics of the interground clinker and zeolite material combines two desirable characteristics of a cementitious composition in one material.

The term "cementitious," as used herein, means having the properties of cement. The cementitious materials are suitable for a broad range of cementing applications, in particular, as a replacement for hydraulic cement where cement is to be set in a water environment, for control of timing of strength development, for applications where flowability is particularly desired, and where low density slurries are desired.

A process of performing a cementing operation in a subterranean zone penetrated by a wellbore is an embodiment of the present invention. The process comprises placing a gypsum-free cementitious composition into the subterranean zone and allowing the cementitious composition to set therein. The gypsum-free cementitious composition is also an embodiment of the present invention and comprises a carrier fluid, and a base grind comprising cement clinker interground with zeolite. The interground base grind has a bimodal distribution of particle size, and has an exterior surface area greater than 10,000 cm$^2$/g. The cementing operation may be primary cementing or remedial cementing, for example. The gypsum-free cementitious composition may include in the base grind a first pozzolan interground therewith, a first and second pozzolan interground therewith, or a first, second and third pozzolan interground therewith, each pozzolan comprising fly ash, slag, diatomaceous earth, fumed silica, calcined shale, metakaolin, rice husk ash, natural pozzolan such as volcanic ash, or a combination thereof. When a pozzolan is interground in the base grind, the pozzolan is present in an amount to replace less than 100% of the zeolite of the base grind.

A further embodiment of the present invention includes gypsum in the base grind. In this embodiment, the process of performing a cementing operation in a subterranean zone penetrated by a wellbore comprises placing a gypsum-containing cementitious composition into the subterranean zone and allowing the cementitious composition to set therein. The gypsum-containing cementitious composition is also an embodiment of the present invention and comprises a carrier fluid, and a base grind comprising cement clinker interground with zeolite and gypsum wherein the amount of zeolite is greater than 5% to about 95% by weight of the base grind. The interground base grind has a bimodal distribution of particle size and, in a certain embodiment, has an exterior surface area greater than 10,000 cm$^2$/g. The cementing operation may be primary cementing or remedial cementing, for example.

A gypsum-free interground composition is a further embodiment of the present invention. The gypsum-free interground composition comprises a base grind comprising cement clinker interground with zeolite. The interground composition has a bimodal distribution of particle size and, in certain embodiments, has an exterior surface area greater than 10,000 cm$^2$/g.

An interground composition comprising gypsum is an embodiment of the present invention. The composition comprises a base grind of cement clinker interground with zeolite and gypsum wherein the amount of zeolite is greater than 5% to about 95% by weight of the base grind. The interground composition has a bimodal distribution of particle size and, in certain embodiments, the interground composition has an exterior surface area greater than 10,000 cm$^2$/g.

Base Grind and Intergrinding: The term "base grind" as used herein means the components that are interground together. For gypsum-free embodiments, the base grind comprises cement clinker and zeolite. For embodiments containing gypsum, the base grind comprises cement clinker, zeolite and gypsum. The base grind in either case may also include one or more pozzolans. The amount of a component of a base grind is based on the weight percent of the base grind.

The term "intergrinding" or "interground" as used herein means using a rod mill or a ball mill, for example, as known by one of ordinary skill in the art to reduce the particle size of the components of the base grind to achieve an exterior surface area and particle size that provides unexpected properties of rheology and compressive strength in a subsequent slurry made therefrom as compared to those properties of a blended composition having the same components. Base grinds of embodiments of the compositions of the present invention have an exterior surface area greater than 10,000 cm$^2$/g or an exterior surface area ranging between any of and including any of 10,100 cm$^2$/g, 10,500 cm$^2$/g, 11,000 cm$^2$/g, 11,500 cm$^2$/g, 12,000 cm$^2$/g, 12,500 cm$^2$/g, 13,000 cm$^2$/g, 13,500 cm$^2$/g, 14,000 cm$^2$/g, 14,500 cm$^2$/g, 15,000 cm$^2$/g, 15,500 cm$^2$/g, and 16,000 cm$^2$/g. Such grinds unexpectedly have a bimodal distribution of particle size as described herein. A mean particle size is between about 10 and 30 microns. For a base grind of 40% zeolite and 60% cement clinker (w/w) having an exterior surface area of about 14,000 cm$^2$/g, a smaller peak of the bimodal curve has a peak particle size of about 4 microns and the larger peak of the bimodal curve has a peak particle size of about 18 microns.

External surface area is measured using a MASTER-SIZER® 2000 laser particle size analyzer (Malvern Instruments Ltd., Malvern, UK) according to the manufacturer's instructions. Exterior surface area was determined by laser during the particle size analysis for determining mean and cumulative particle size. Surface area may also be determined using air permeability or nitrogen adsorption, light extinction, light scattering methods, or X-ray methods, techniques that are well known to those of ordinary skill in the art.

Zeolites: Zeolites are porous alumino-silicate minerals that may be either a natural or manmade material. Manmade zeolites are based on the same type of structural cell as natural zeolites, and are composed of aluminosilicate hydrates having the same basic formula as given below. It is understood that as used herein, the term "zeolite" means and encompasses all natural and manmade forms of zeolites. All zeolites are composed of a three-dimensional framework of SiO$_4$ and AlO$_4$ in a tetrahedron, which creates a very high surface area. Cations and water molecules are entrained into the framework. Thus, all zeolites may be represented by the crystallographic unit cell formula:

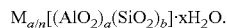

$$M_{a/n}[(AlO_2)_a(SiO_2)_b] \cdot xH_2O.$$

M represents one or more cations such as Na, K, Mg, Ca, Sr, Li or Ba for natural zeolites and NH$_4$, CH$_3$NH$_3$, (CH$_3$)$_3$NH, (CH$_3$)$_4$N, Ga, Ge and P for manmade zeolites; n represents the cation valence; the ratio of b:a is in a range from greater than or equal to 1 and less than or equal to 5; and x represents the moles of water entrained into the zeolite framework.

Zeolites for use in the compositions of the present embodiments include analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), stilbite (hydrated sodium calcium aluminum silicate) or thomsonite (hydrated sodium calcium aluminum silicate), or combinations thereof. In certain embodiments of the invention, the zeolites for use herein include chabazite, clinoptilolite, or a combination thereof.

For the compositions of the present embodiments, zeolite is a component of a base grind. For compositions that are gypsum-free, the amount of zeolite in the base grind is between 0% and 100% by weight. For compositions of the present embodiments that contain gypsum, the amount of zeolite in the base grind is from about 5% to 95% by weight. In additional embodiments of the compositions, zeolite is present in an amount ranging between any of and including any of 10%, 15%, 20%, 25%, 30%, 40%, 50%, 60%, 70%, 80%, or 90% by weight of the base grind.

Cement Clinker: Cement clinker is the main component in portland cement and is produced by the heat treatment of the raw materials limestone, clay minerals and metals. In general, limestone (calcium carbonate) and clay (containing silicon, aluminum, and iron) in about a 2:1 weight ratio are heated in a kiln. A mixture of several products termed "cement clinker" forms due to chemical reactions that result from the heating process. Suitable cement clinker for use in the compositions of the present embodiments include Portland cement clinker for each of ASTM Type I, IA, II, III, and V cements, API cement clinker for each of Class A, C, G and H cements and Canadian Type 10 cement clinker. Other suitable cement clinkers include those having high sulfate or moderate sulfate resistance, and those that are non sulfate resistant. In the manufacture of cement, cement clinker is ground with gypsum (hydrated calcium sulfate).

Cement clinker is present in a base grind of the compositions of the present embodiments in an amount of from about 5% to about 95% by weight of the base grind. In embodiments of the invention, cement clinker is present in the base grind in an amount ranging between any of and including any of 5%, 10%, 15%, 20%, 25%, 30%, 35%, 40%, 45%, 50%, 55%, 60%, 65%, 70%, 75%, 80%, 85%, 90%, and 95% by weight of the base grind.

Gypsum: According to certain embodiments, gypsum (hydrated calcium sulfate) is interground with zeolite and pozzolan in the base grind of the compositions. Gypsum may be present in an amount of from greater than 0% to about 10% by weight of base grind. In further embodiments, gypsum is present in the base grind in an amount ranging between any of and including any of 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, and 10.0% by weight of clinker in the base grind. A suitable gypsum product is commercially available from Lehigh Inland Cement Limited (Edmonton, Alberta, Canada).

Further Pozzolans as Components of the Base Grind: Further pozzolans may be included in the base grind such as fly ash (Class C or Class F), slag, diatomaceous earth, fumed silica, calcined shale, metakaolin, rice husk ash, a natural pozzolan, or a combination thereof. The amount of pozzolan present in the base grind replaces zeolite in the base grind in an amount of less than 100% of the zeolite. The amount of each component in such a binary, ternary, or quaternary base grind can be increased or decreased depending upon the properties desired in the product in terms of rheology, improved early strength, compressive strength development, light weight or a combination thereof. Fly ash is commercially available from Ashcor Technologies Limited (Calgary, Alberta, Canada); slag is commercially available from Holcim (Calgary, Alberta, Canada); fumed silica is commercially available from Fritz Industries (Mesquite, Tex., USA) and Elkem Group (Oslo, Norway); diatomaceous earth is commercially available from Western Pozzolan Corp. (Doyle, Nev., USA); calcined shale is commercially available from TXI (Houston, Tex., USA); metakaolin is commercially available from ISG Resources (South Jordan, Utah, USA) and Advanced Cement Technologies, LLC. (Blaine, Wash., USA); and rice husk ash is commercially available from Hi Rise Exports Private Ltd. (Calcutta, India) and Kittiya (U-Thaimai, Utaitanee, Thailand).

Optional Additives: Additives known to those of ordinary skill in the art may be included in the cementitious compositions of the present invention. Additives are typically dry blended with the base grind after the base grind is interground or may be added to a cementitious slurry. An additive may comprise an accelerator, a retarder, an activator, a defoamer, silica, a fluid loss control additive, a flow enhancing agent, a dispersant, an extender, a lost circulation control agent, a gas migration agent, an expansive agent, a weight altering agent for increasing or decreasing density or for changing the water requirement, or a combination thereof, for example. Selection of the type and amount of additive largely depends on the nature and composition of the set composition, and those of ordinary skill in the art will understand how to select a suitable type and amount of additive for compositions herein.

Suitable activator additives are catalysts for the setting reaction and may be one or more of lime, lime hydrate, calcium hydroxide, calcium chloride, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or hydrates thereof, for example.

Suitable setting accelerators increase the rate of the setting reaction and include sodium chloride, sodium sulfate, sodium aluminate, sodium carbonate, calcium sulfate, calcium carbonate, aluminum sulfate, potassium sulfate, potassium carbonate and alums, or a combination thereof, for example.

Suitable retarders slow the setting time of a cementitious composition, thereby allowing for control of the setting time of such a composition. Controlling the setting time is desirable to allow flexibility to adjust to wellbore conditions, or to adjust for adequate removal of drilling or spacer fluids. Suitable retarders include a lignosulfonate, an organic acid having an $\alpha$-hydroxy group such as citric acid, tartaric acid or gluconic acid, salts thereof, or a combination thereof, for example. Further suitable carboxylic acids that retard the setting time include carboxylic acids such as malic acid, lactic acid, combinations thereof, as well as alkaline earth metal salts thereof such as calcium, potassium, or barium salts, and the like. The salt of the organic acid may have a cation containing an element of the periodic chart listed in Group I or in Group II.

Suitable defoamers or dispersants include polypropylene glycol, polypropylene glycol on diatomaceous earth, or a mixture of polypropylene glycol, olefin oil and hydrophobically modified silica, salts of sulfonated naphthalene-formaldehyde condensate, salts of sulfonated naphthalene-formaldehyde condensates combined with polyvinylpyrolidone, salts of sulfonated melamine-formaldehyde condensates, salts of polyether polycarboxylate, sulfonic-acid esters, carbohydrate esters or modified lignosulfonates, for example. A salt may be a calcium salt or a sodium salt or a combination thereof.

Carrier Fluids: Carrier fluids suitable for use in compositions of the present embodiments include aqueous fluids, oil-based and synthetic-based fluids, emulsions, or mixtures thereof.

Exemplary aqueous fluids include but are not limited to water and water-based gels. When the carrier fluid comprises water, the water can be fresh water, unsaturated salt solution, including brines and seawater, and saturated salt solution. Exemplary oil-based fluids include but are not limited to canola oil, kerosene, diesel oil, fish oil, mineral oil, sunflower oil, corn oil, soy oil, olive oil, cottonseed oil, peanut oil and paraffin. Exemplary synthetic-based fluids include but are not limited to esters, olefins or ethers, e.g., esters having a $C_2$-$C_{12}$ alcohol portion and a $C_{16}$-$C_{24}$ carboxylic acid portion, olefins having a $C_6$-$C_{18}$ linear internal portion, or ethers having a $C_6$-$C_{24}$ portion.

The carrier fluid is present in an amount of from about 0.18 cubic meters to about 12 cubic meters of carrier fluid per metric tonne of components of the base grind. In further embodiments, the carrier fluid is present in an amount ranging between any of and including any of 0.2 $m^3$, 0.5 $m^3$, 1.0 $m^3$, 1.5 $m^3$, 2.0 $m^3$, 2.5 $m^3$, 3.0 $m^3$, 3.5 $m^3$, 4.0 $m^3$, 4.5 $m^3$, 5.0 $m^3$, 5.5 $m^3$, 6.0 $m^3$, 6.5 $m^3$, 7.0 $m^3$, 7.5 $m^3$, 8.0 $m^3$, 8.5 $m^3$, 9.0 $m^3$, 9.5 $m^3$, 10.0 $m^3$, 10.5 $m^3$, 11.0 $m^3$, 11.5 $m^3$, and 12.0 $m^3$ of carrier fluid per metric tonne of components of the base grind.

Those of ordinary skill in the art will understand that the carrier fluid for the compositions as provided herein depends upon the properties desired for the compositions, as well as the cost, availability, temperature, stability, viscosity, clarity, and the like of the carrier fluid, and further that non-aqueous carrier fluids are used when the composition is expected to be exposed to an aqueous fluid in the well for the composition to set. For example, such aqueous fluids may come from the cementitious slurry or from the subterranean formation.

Setting Conditions: Setting of the cementitious compositions of the present embodiments may occur under a variety of conditions including variations in time and temperature. In general, the rate of compressive strength development increases with temperature. Setting temperatures of about 0° F. to about 572° F. (−17.8° C. to 300° C.) are appropriate for setting of the present compositions. In further embodiments, a temperature ranging between any of and including any of 20° F. (−6.7° C.), 30° F. (−1.1° C.), 50° F. (10.0° C.), 70° F. (21.1° C.), 90° F. (32.2° C.), 110° F. (43.3° C.), 130° F. (54.4° C.), 140° F. (60.0° C.), 150° F. (65.6° C.), 160° F. (71.1° C.), 170° F. (76.7° C.), 180° F. (82.2° C.), 190° F. (87.8° C.), 200° F. (93.3° C.), 220° F. (107.2° C.), 250° F. (121.1° C.), 300° F. (148.9° C.), 350° F. (176.7° C.), 400° F. (204.4° C.), 450° F. (232.2° C.), 500° F. (260° C.), and 550° F. (287.8° C.) is appropriate for setting of the present compositions. A target setting time for a composition of the present embodiments is adjusted to between, for example, one to 14 days, by adjusting the amounts of the components described herein depending upon circumstances surrounding the drilling operations. A target setting time for a cementitious composition of the present invention may be adjusted such that the composition remains fluid for about 0.5 hours to about 8 hours or about 12 hours to allow placement behind casing materials, and then sets within an acceptable time period. The compositions may comprise a slurry density of about 900 kg/m$^3$ to about 2400 kg/m$^3$ or a slurry density ranging between any of and including any of 1000 kg/m$^3$, 1200 kg/m$^3$, 1400 kg/m$^3$, 1600 kg/m$^3$, 1800 kg/m$^3$, 2000 kg/m$^3$, and 2200 kg/m$^3$. In one embodiment, the slurry density is about 1400 kg/m$^3$.

A process of preparing a gypsum-free cementitious composition is an embodiment of the present invention. The process comprises intergrinding a composition comprising cement clinker and zeolite to form a base grind; and mixing the base grind with a carrier fluid to form a slurry. The base grind has a bimodal distribution of particle size and, in certain embodiments, has an exterior surface area greater than 10,000 cm$^2$/g. In a further embodiment, the process includes allowing the slurry to set.

Another embodiment of the present invention is a process of preparing a cementitious composition comprising intergrinding a composition comprising cement clinker, zeolite, and gypsum to form a base grind wherein the zeolite is present in the base grind in an amount of from about 5% to about 95% by weight; and mixing the base grind with a carrier fluid to form a slurry. The base grind has a bimodal distribution of particle size and, in certain embodiments, has an exterior surface area greater than 10,000 cm$^2$/g. In a further embodiment, the process includes allowing the slurry to set.

The following examples are illustrative of the processes and compositions discussed above.

A MASTERSIZER® 2000 laser particle size analyzer (Malvern Instruments Ltd., Malvern, UK) was used for determining mean and cumulative particle size according to the manufacturer's instructions. Exterior surface area was determined by laser during the particle size analysis. The specific total exterior and interior surface area was determined by a nitrogen-adsorption analysis using the Brunauer-Emmett-Teller Method, as described by Branauer et al. (*J. Am. Chem. Soc.*, 60, 309-19, 1938).

Slurries in the following examples were prepared, and compressive strength data were determined by Non-Destructive Sonic Testing as set forth in API Specification 10B 22nd Edition, 1997, of the American Petroleum Institute.

Free water data were gathered according to Section 15.5 of Addendum 2 of the API Specification 10B 22nd Edition, 1997, of the American Petroleum Institute. Generally, according to the API Specification, 250 ml of each cement composition was poured into its own 250 ml graduated glass cylinder and then sealed with a plastic film wrap to prevent evaporation. A two hour test period was then initiated, in which the graduated cylinders were left standing. After two hours, the free fluid that had gathered on top of each cement composition inside the cylinder was measured. The percent of free fluid was calculated as the measured milliliters of free fluid multiplied by 100 and then divided by the initial 250 milliliters of the cement composition.

Rheology results were obtained generally according to the procedures set forth in Section 12 of the API Specification RP 10B, 22nd Edition, 1997, of the American Petroleum Institute. Viscosity (dial reading) of the cement composition was measured using a Fann Model 35 viscometer. The viscosity was taken as the measurement of the dial reading on the Fann Model 35 at the different rotational speeds of 300 to 3 RPM, and at room temperature. For example, the Fann Viscometer is rotated at 300 RPM (revolutions per minute) for 60 seconds and a value on the dial is read, the speed is then changed to 200 RPM and the new value on the dial reading taken. There are a number of theoretical models known to those of ordinary skill in the art that can be used to convert the values from the dial readings at the different RPM's into viscosity (centipoises). In addition, different viscometer models use different RPM values, thus, in some instances, a measurement is not available at a particular RPM value.

EXAMPLE 1

Interground Cement Clinker and Zeolite

The present example provides a grind curve of particle size as a function of grind time for a composition of 60% cement clinker interground with 40% zeolite (w/w), designated herein as Composition 1. Cement clinker was obtained from Lehigh Inland Cement Limited (Edmonton, Alberta, Canada). Zeolite (FDP-C661-02, a clinoptilolite) was obtained from C2C Zeolite Corporation (Calgary, Canada), and mined from near Princeton, British Columbia. Cement clinker does not include gypsum. Therefore, the composition of the present example does not include gypsum.

Zeolite was dried for at least about 24 hours at 120° C. prior to grinding. Cement clinker was crushed to approximately 10-mesh using a jaw crusher. Representative 1 kg samples of 60% cement clicker and 40% zeolite (w/w) were dry ground in steel rod mills to determine a grind curve, i.e., particle size as a function of grind time. A representative 1 to 2 gram portion of the grind tests was analyzed using a MASTERSIZER® 2000 laser particle size analyzer (Malvern Instruments Ltd., Malvern, UK). A mean particle size of 10.1 μm was achieved at 74 minutes of grinding time.

Further, the specific surface area of a 2-gram portion from a grind having a mean particle size of 11.1 μm was determined by two methods. The specific exterior surface area determined by laser during the particle size analysis (referred to as a "wet process") was 13,100 cm²/g. The specific total exterior and interior surface area determined by the nitrogen-adsorption analysis of the Branauer-Emmett-Teller Method (dry process) was 259,400 cm²/g.

A summary of the grind curve results is set forth in by Table 1 and FIG. 1.

TABLE 1

Properties of Interground Composition 1 with Increasing Grinding Time

| Grind Time (minutes) | Mean Particle Size (μm) | Exterior Surface Area - (cm²/g) | Exterior and Interior Surface Area - (cm²/g) |
|---|---|---|---|
| 10 | 29.1 | 07,800 | — |
| 20 | 17.4 | 10,100 | — |
| 40 | 12.4 | 11,700 | — |
| 54 | 11.1 | 13,100 | 259,400 |
| 74 | four determinations: 10.1 10.8 11.0 11.1 ave. 10.8 | 14,100 | — |
| 90 | 9.0 | 14,900 | — |

The data of Table 1 and FIG. 1 demonstrate that as grind time increases, the mean particle size decreases and approaches a plateau. Exterior surface area also increases with grind time and approaches a plateau as shown in Table 1.

Figure 2:
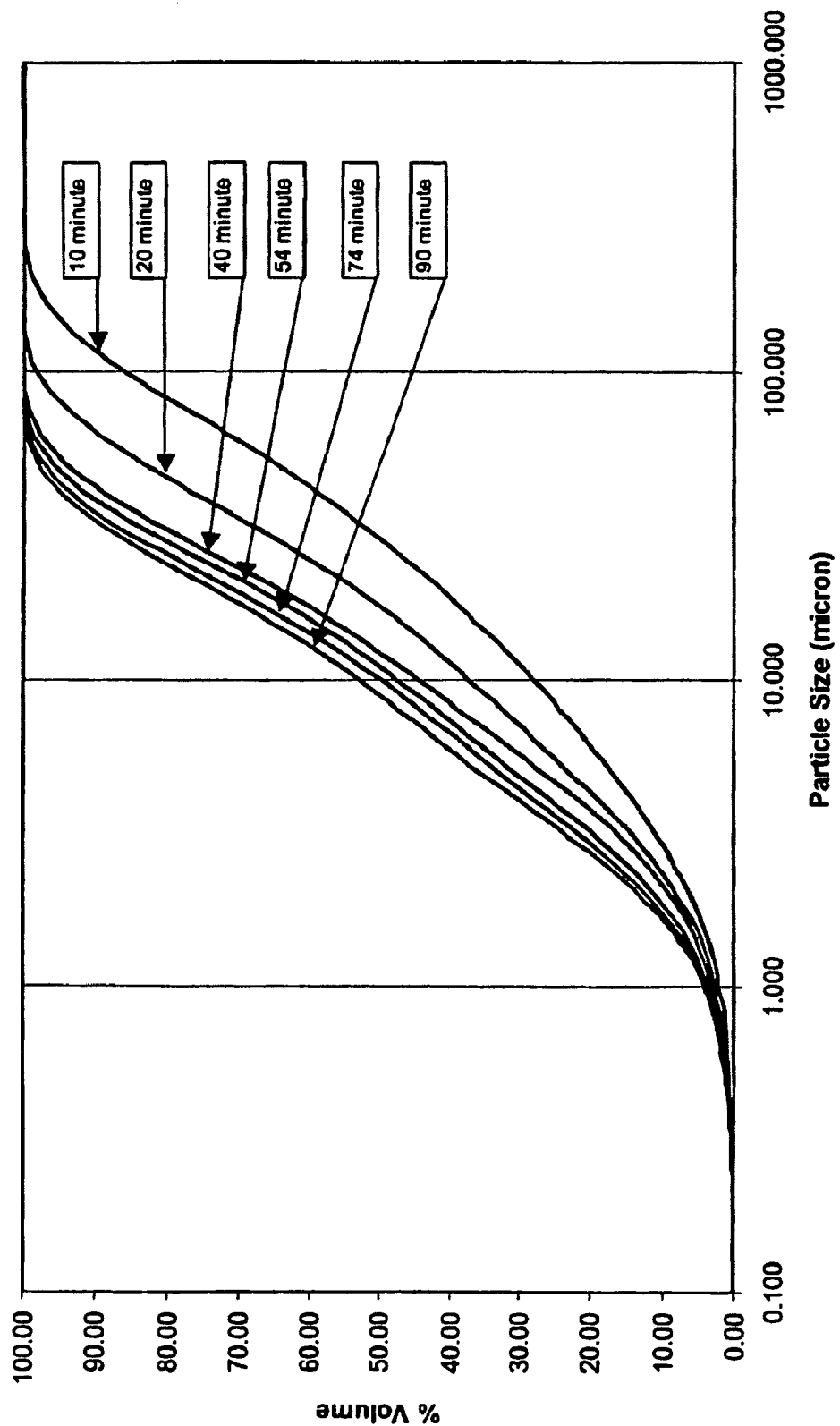
FIG. 2. is a graph of percent volume as a function of particle size at various grinding times for a composition of 60% cement clinker interground with 40% zeolite (w/w)

FIG. 2 shows a cumulative particle size distribution as a function of grinding time of Composition 1. As grind time increases, cumulative particle size distribution becomes more uniform, i.e., narrower or tighter.

Figure 3:
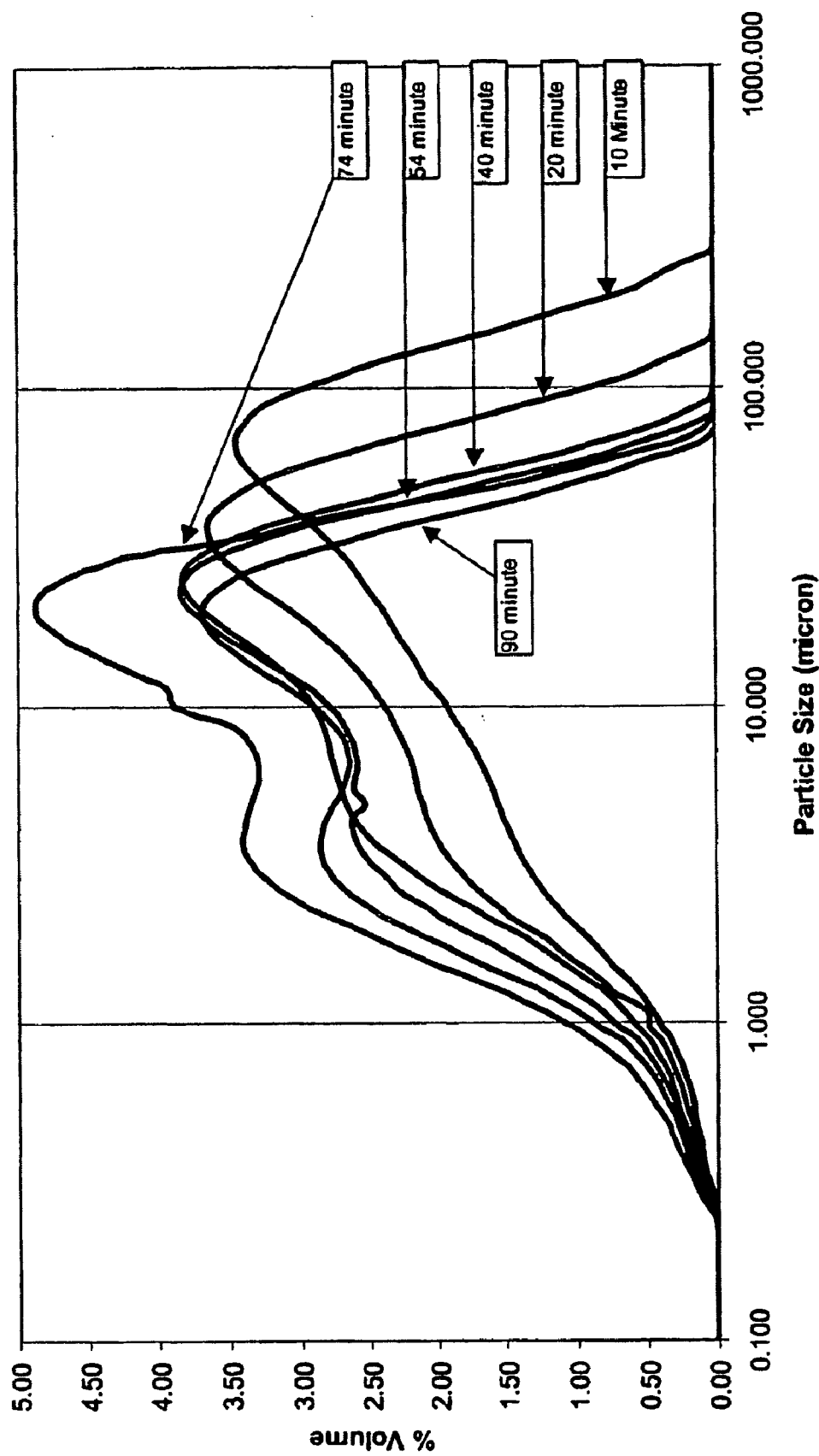
FIG. 3. is a graph of percent volume as a function of particle size at various grinding times for a composition of 60% cement clinker interground with 40% zeolite (w/w)
Figure 7:
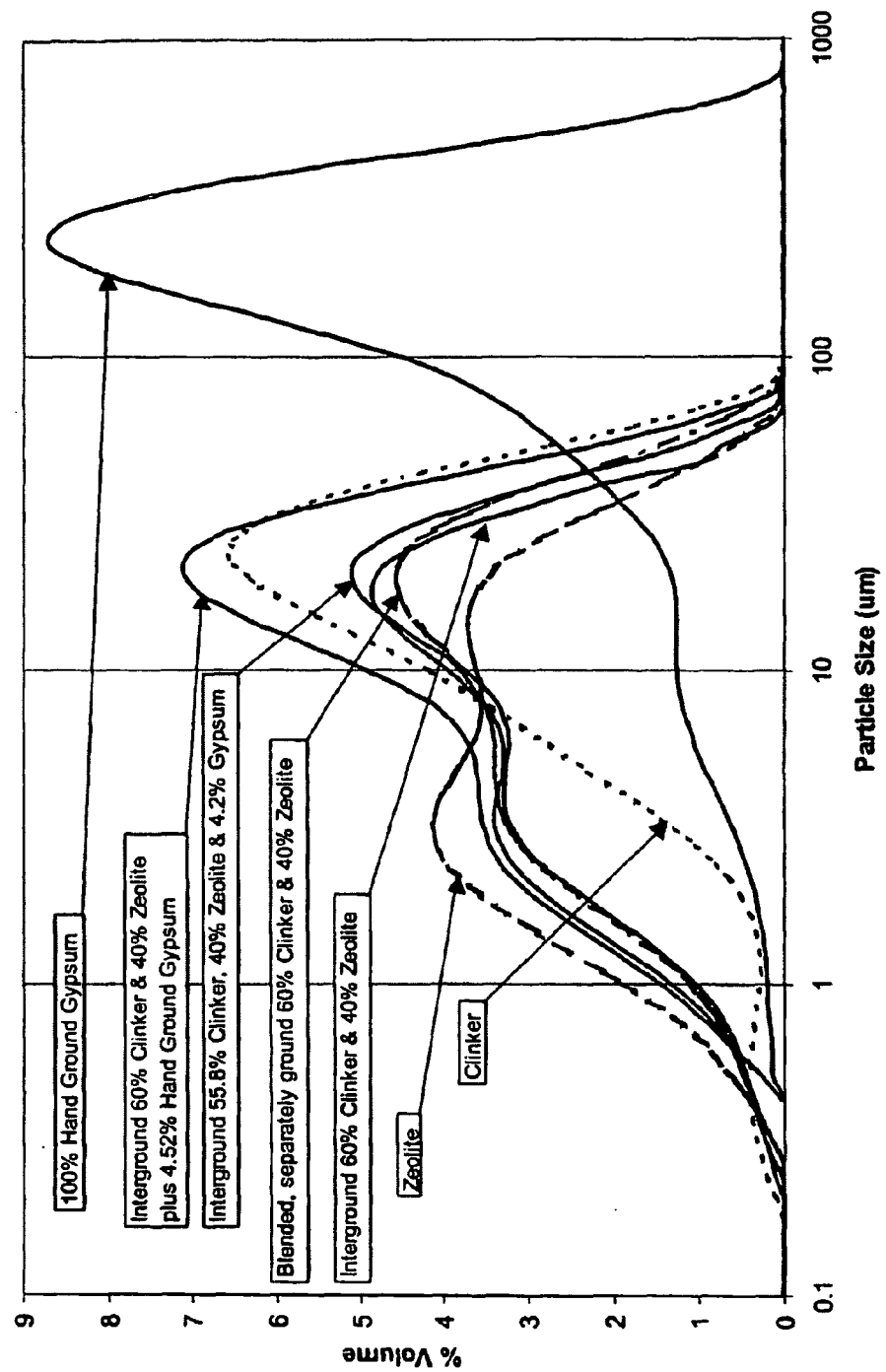
FIG. 7. is a comparison graph of percent volume as a function of particle size for various compositions that include one or more of clinker, zeolite, and gypsum.

FIG. 3 shows the particle size distribution at grinding times of 10 minutes, 20 minutes, 40 minutes, 54 minutes, 74 minutes, and 90 minutes for Composition 1. A bimodal distribution of particle size is more prominent with increased grinding time. The peak particle size for the smaller sized peak at a grind time of 74 minutes appears to be about 3.8 μm, and the peak particle size for the larger sized peak for the same grind time appears to be about 20 μm, while the mean particle size for a 74 minute grind time is 10.1 μm. As shown in FIG. 7 and described below, the smaller peak is likely to represent predominantly zeolite and the larger peak is likely to represent predominantly cement clinker.

The specific total exterior and interior surface area of a degassed sample (1.6691 g) ground for 54 minutes (mean particle size of 11.143 μm) was determined using the nitrogen-adsorption analysis (a "dry process"). The total surface area was recorded as 259,400 cm²/g as shown in Table 1.

A measurement of the volume of gas adsorbed as a function of pressure was also made using the Brunauer-Emmett-Teller method cited above. As relative pressure is increased on a 54 minute ground sample (mean particle size of 11.1 μm), and then subsequently decreased, a gap in the volume of gas adsorbed between relative pressure P/Po values of 0.4 and 0.9 was demonstrated. This gap indicates the presence of internal mesopores in the sample and that the gas takes more time to be released from the internal pores.

A pore volume histogram was also done on a 54 minute ground sample (mean particle size of 11.1 μm), by measuring pore volume in cc/g versus pore width in angstroms. A bimodal distribution of pore sizes was observed.

Figure 4:
FIG. 4. is a micrograph of a composition of 60% cement clinker interground with 40% zeolite (w/w)
Figure 5:
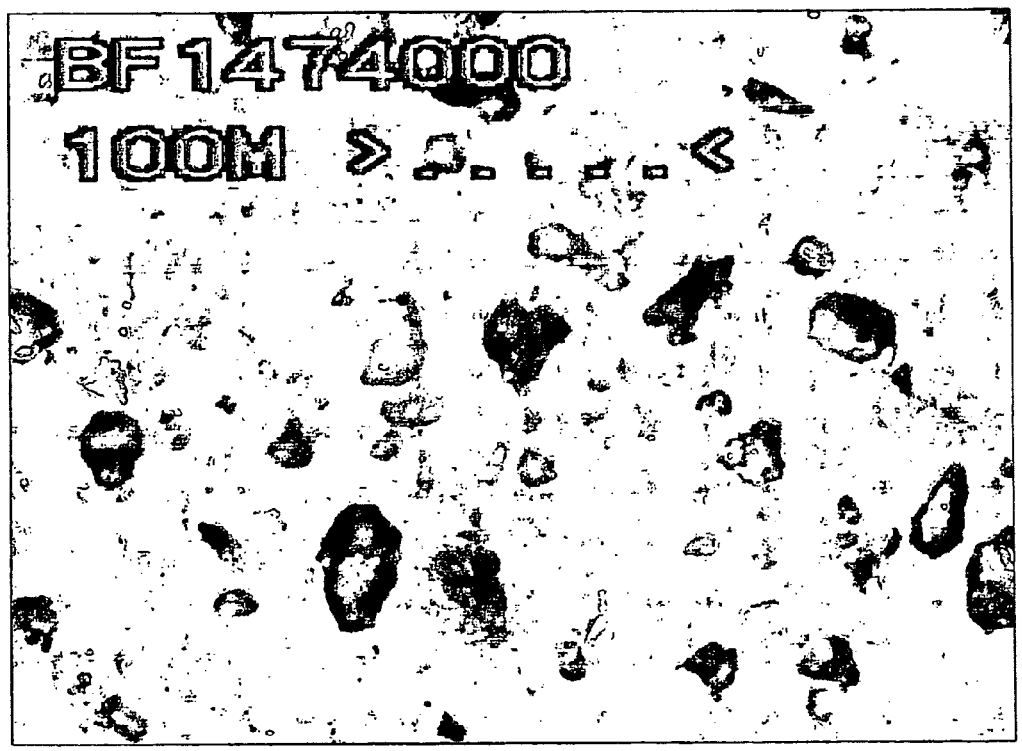
FIG. 5. is a micrograph of a composition of 60% cement clinker interground with 40% zeolite (w/w)

FIG. 4 and FIG. 5 show micrographs of Composition 1 for a 74 minute grind. The distance between the arrows symbolizes a distance of 100 microns. Measurements of particle size of these samples resulted in a determination of mean particle size as 7.6 μm. The difference between this measurement and that of the particle size analyzer is likely due to a smaller sample size.

The data of the present example demonstrate that an interground composition of zeolite and cement clinker provides a bimodal distribution of particle sizes, that mean particle size decreases with increasing grinding time, that exterior surface area increases with increased grinding time, and that the composition contains internal mesopores that also have a bimodal distribution of pore size.

EXAMPLE 2

Interground vs. Blended, Separately Ground Compositions

The present example relates to the properties of interground cement clinker and zeolite as compared to the properties of blended, separately ground cement clinker and zeolite.

The interground cement clinker and zeolite sample for Examples 2 through 4 herein is the 74 minute grind as described in Example 1 and is designated Composition 1.

The blended sample is a mixture of separately ground clinker and separately ground zeolite. Since the bimodal distribution of particle size of Composition 1 has two peaks of about 3.8 μm and about 20 μm (likely predominantly zeolite and clinker, respectively) the separately ground clinker was ground to an approximate particle size of about 20 μm and the zeolite was separately ground to a particle size of about 5.8 μm. The separately ground zeolite has a bimodal distribution of peak particle size of about 3.3 μm and 15.1 μm as discussed below for FIG. 7. The separately ground samples were then mixed in a weight/weight ratio of 60% clinker and 40% zeolite. This composition was designated as Composition 2.

Separately ground clinker was designated as Composition 3.

Separately ground zeolite was designated as Composition 4.

Table 2 provides particle size, surface area, and grind time for interground (Composition 1) vs. separately ground (Composition 2) compositions of the present example, for ground 100% clinker (Composition 3), and for ground 100% zeolite (Composition 4). The ground clinker Composition 3 was determined in two separate 1 kg grinds.

TABLE 2

Properties of Interground Composition 1 and Blended Separately Ground Composition 2.

| Composition No. | Sample | Particle Size (μm) | Surface area (cm²/g) | Grind time (min) |
|---|---|---|---|---|
| 1 | Interground 60% clinker and 40% zeolite | 10.1 | 14100 | 74 |

TABLE 2-continued

Properties of Interground Composition 1 and Blended Separately Ground Composition 2.

| Composition No. | Sample | Particle Size (μm) | Surface area (cm²/g) | Grind time (min) |
|---|---|---|---|---|
| 2 | Blended (separately ground) 60% clinker, 40% zeolite | 9.8 | 14900 | — |
| 3 | 100% ground clinker | 18.0, 18.0 | 10200, 10700 | 105, 105 |
| 4 | 100% ground zeolite | 5.8 | 19000 | 130 |

Figure 6:
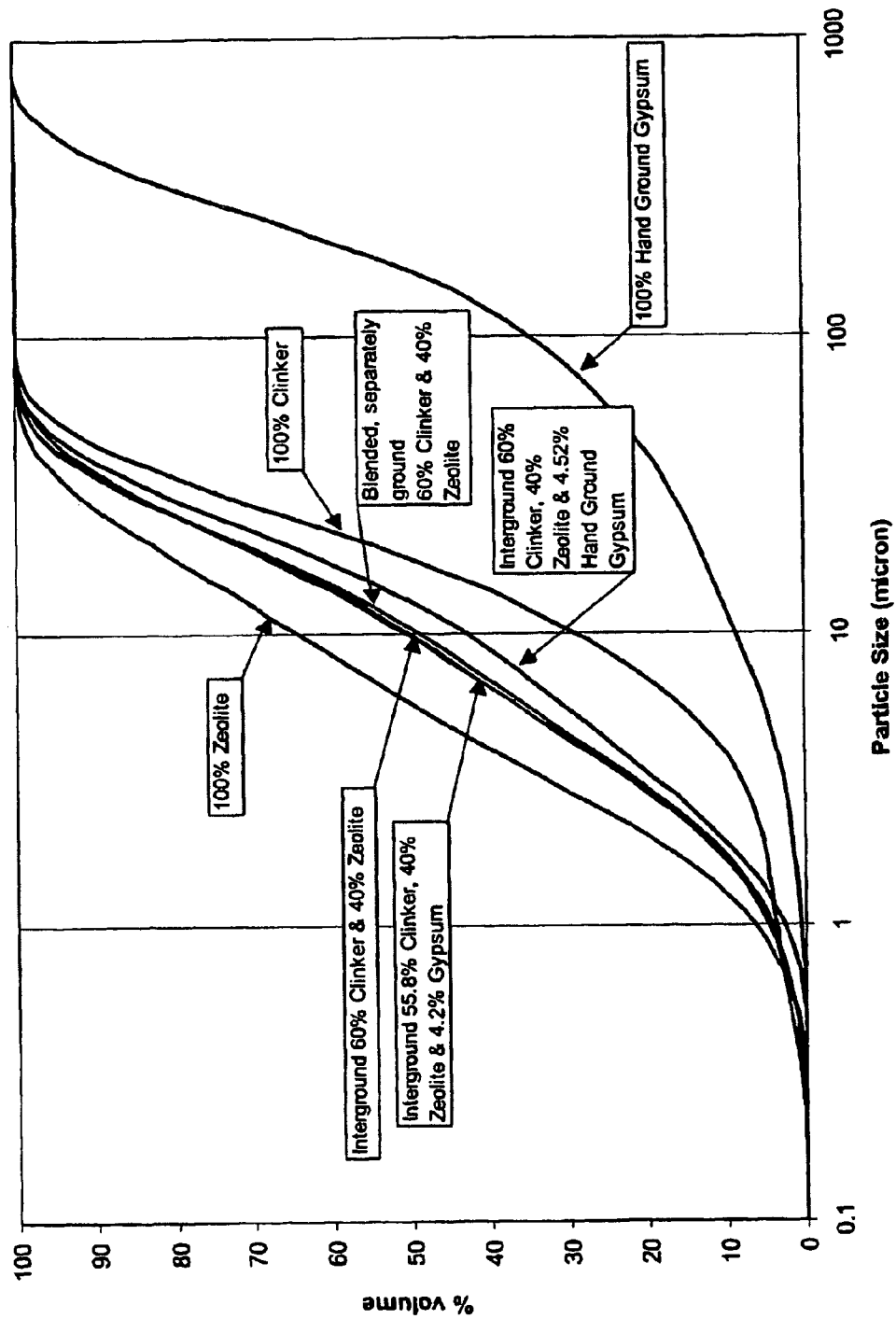
FIG. 6. is a comparison graph of percent volume as a function of particle size for various compositions that include one or more of clinker, zeolite, and gypsum.

FIG. 6 provides a comparison of cumulative particle size distribution for Compositions 1-4. The interground clinker and zeolite (Composition 1), and separately ground clinker and zeolite (Composition 2) have essentially identical cumulative particle size distributions, which distribution differs both from that of 100% ground zeolite, and that of 100% ground clinker. The essentially identical cumulative particle size distributions indicate that particle size is controlled for further comparison of properties of the two compositions. The data of Table 2 further support this conclusion in that the particle size of the blended sample, while slightly lower than that of the interground sample, nevertheless provides a good control for comparing the two types of compositions.

EXAMPLE 3

Presence or Absence of Gypsum

The present example relates to the properties of three compositions: interground cement clinker and zeolite, Composition 1; interground cement clinker, zeolite, and gypsum, Composition 5; and an interground cement clinker and zeolite composition (i.e., Composition 1) blended with hand-ground gypsum, Composition 7. The hand-ground gypsum had been ground and sieved to a particle size of about 168 μm. The amount of each ingredient by weight, the particle size, the surface area, and grind time for Compositions 1, 5, and 7 are provided in Table 3. The amount of gypsum provided the same ratio of clinker to gypsum for Compositions 5 and 7. Duplicate determinations were carried out on Composition 5.

TABLE 3

Compositions With and Without Gypsum

| Composition No. | Sample | Particle Size (μm) | Surface area (cm²/g) | Grind time (min) |
|---|---|---|---|---|
| 1 | Interground 60% clinker and 40% zeolite | 10.1 | 14,100 | 74 |
| 5 | Interground 55.8% clinker, 40% zeolite and 4.2% gypsum | 10.4, 10.5 | 14,400, 14,700 | 105, 105 |
| 7 | Interground composition 1, blended with hand-ground gypsum 4.52% by weight of Composition 1. | 13.0 | 11,500 | — |

The interground Compositions 1 and 5 compare favorably in particle size and surface area. The difference in grind time to achieve a particle size of about 10 microns is likely attributable to different operators and mechanical slippage during the grind. FIG. 6 provides a comparison of cumulative particle size distribution and FIG. 7 provides a comparison of particle size distribution, each for Compositions 1, 5 and 7. Compositions 1, 5 and 7 have comparable bimodal distributions of particle size which distributions both differ from that of 100% ground zeolite; and that of 100% ground clinker. Therefore, the compositions have essentially identical particle size indicating that particle size is essentially controlled for comparison of further properties of the three compositions.

EXAMPLE 4

Properties of Cementitious Compositions, Interground vs. Blended, and With and Without Gypsum The present example relates to properties of cementitious compositions of interground as compared to separately ground and blended zeolite and cement clinker compositions, with or without gypsum.

The cementitious compositions were formed by mixing the components in the amounts set forth in Table 4 and additives were added by weight of components according to the methods of API Specification RP 10B, 22nd Edition, 1997, of the American Petroleum Institute. Sodium sulfate ($Na_2SO_4$) and sodium carbonate ($Na_2CO_3$) are commercially available and were obtained from Sodium Solutions (Edmonton, Canada) under the trade names CA-661 and K-35, respectively. A defoamer, containing internal olefin oil, polypropylene glycol, hydrophobically modified silica and diatomaceous earth, is commercially available and was obtained from Halliburton Energy Services (Duncan, Okla.), under the trade name D-Air 3000. Duplicate determinations of compressive strength were carried out for Compositions 1 and 5.

TABLE 4

Cementitious Compositions[3]

| Cementitious Composition No. | Class C cement[2] | Components (w/w) Clinker, Type 10 | Zeolite | Gypsum | Additives (bwoc[1]) Na$_2$SO$_4$ | Na$_2$CO$_3$ | D-Air 3000 | Water ratio m$^3$/tonne[4] | Slurry Vol. m$^3$/tonne[4] |
|---|---|---|---|---|---|---|---|---|---|
| 1 | — | Interground 60% clinker and 40% zeolite | | — | 4.5% | 2.25% | 0.1% | 1.341 | 1.718 |
| 2 | — | separately ground 60% clinker | separately ground 40% zeolite | — | 4.5% | 2.25% | 0.1% | 1.341 | 1.718 |
| 5 | — | Interground 55.8% type 10 clinker, 40% zeolite, and 4.2% gypsum[5] | | | 4.5% | 2.25% | 0.1% | 1.333 | 1.713 |
| 6 | 60.0% | — | 40% | — | 4.5% | 2.25% | 0.1% | 1.341 | 1.718 |
| 7 | — | Interground 60% clinker and 40% zeolite | | hand-ground, 4.52% by weight of interground material[5] | 4.5% | 2.25% | 0.1% | 1.40 | 1.79 |

[1]By weight of total components
[2]Class C cement is ground clinker and gypsum in a w/w ratio of about 100:7
[3]All cementitious compositions of Table 4 have a slurry density of 1400 kg/m$^3$
[4]Cubic meters of water per metric ton of total components as components are set forth in Table 4.
[5]The amount of gypsum is about 7% in weight relation to cement clinker. This approximates the amount of gypsum in Class C cement for comparison purposes.

Compressive strength, rheology and free fluid were determined as described above. Exterior surface area was determined by the laser process as described in Example 1. The temperature for measurement of rheology and free water is at about room temperature in order to simulate manufacturing conditions. The temperature for measurement of compressive strength is somewhat higher in order to simulate downhole conditions where the pumped compositions are warmed by the downhole environment.

Figure 8:
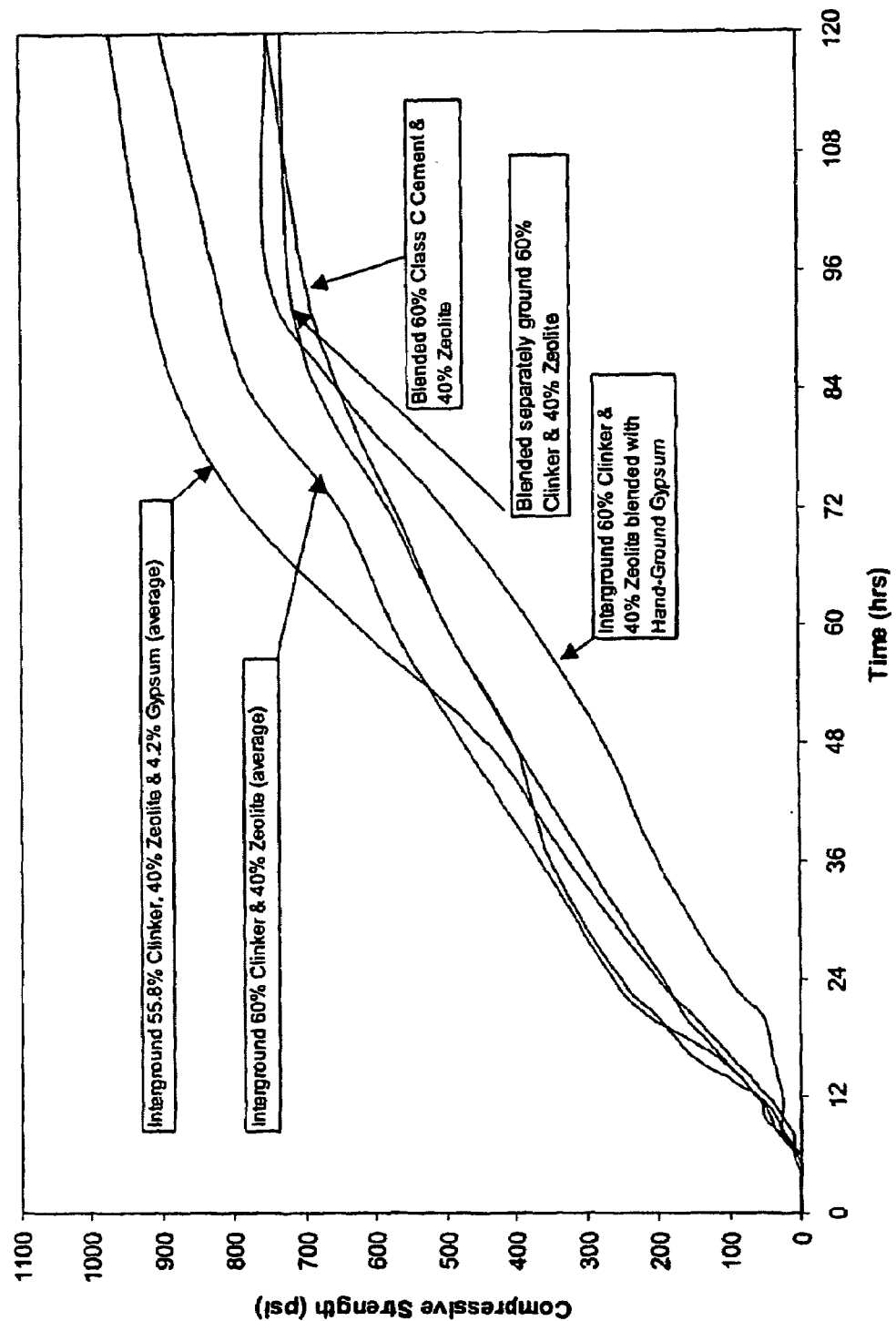
FIG. 8. is a comparison graph of compressive strength versus time for various compositions that include one or more of clinker, zeolite, gypsum and cement.

A comparison of the compressive strength versus time of setting for the five compositions of Table 4 is provided by FIG. 8 and Table 5. The data obtained from interground Compositions 1, and 5 as compared to blended Compositions 2 and 6 demonstrate that the interground compositions appear to have greater long-term compressive strength than do the blended compositions beginning at a set time of about 40 hours. Further, the data obtained from interground Composition 5 having gypsum present as compared to the data from interground compositions not having gypsum present 1 demonstrate that the intergrinding without gypsum provides better compressive strength.

A free water test at room temperature and an angle of deviation of zero degrees provided a trace of free water in 250 mL for Compositions 1 and 2 as summarized in Table 5. Free water excess, i.e., greater than about 2% for downhole applications, indicates separation and likely ensuing problems in a wellbore.

Rheology dial readings were recorded as described above and also at 300, 200, 100, 6 and 3 RPM, then increasing to 6, 100, 200 and then to 300 RPM at 20-second intervals. Rheological data for the compositions of this example are summarized in Table 5. The data demonstrate that the compositions without gypsum have a greater ability to flow than the compositions with gypsum.

TABLE 5

Properties of Cementitious Compositions

| | Rheology Results Dial Reading, ~22° C. | | | | | Compressive Strength ~25° C. | | | Free Water ~22° C. (mL/250 mL) |
|---|---|---|---|---|---|---|---|---|---|
| Comp. No. | 300 RPM | 200 RPM | 100 RPM | 6 RPM | 3 RPM | Time to 0.35 MPa (50 psi) Hr:Min | Time to 3.5 MPa (500 psi) Hr:Min | Final MPa (psi); at 120 h | |
| 1 | 34/32 | 30/31 | 28/29 | 25/25 | 25 | 12:08 (ave) | 50:45 (ave) | 6.20 (900) (ave) | Trace |
| 2 | 29/27 | 24/22 | 24/20 | 13/14 | 12 | 11:40 | 60:21 | 5.03 (730) | Trace |
| 5 | 55/58 | 50/53 | 44/45 | 31/27 | 25 | 13:02 (ave) | 52:31 (ave) | 6.68 (970) (ave) | 0 |
| 6 | 50/43 | 40/38 | 33/31 | 23/22 | 19 | 9:51 | 63:35 | 5.17 (750) | 0 |
| 7 | 43/42 | 38/38 | 32/32 | 22/21 | 16/16 | 20:55 | 70:50 | 5.17 (750) | 0 |

As a control, neat clinker was blended with water in a beaker. Small clumps of material formed in the bottom of the beaker and generated heat immediately. After about 30 minutes, the remaining slurry was thick but movable. Class C cement was also prepared. However, no clumping, heat or increase in consistency occurred in the same time period. Adding water to the ground clinker produced the same results as adding ground clinker to water.

Other embodiments of the present invention will be apparent to those skilled in the art from a consideration of this specification or practice of the embodiments disclosed herein. However, the foregoing specification is considered merely exemplary of the present invention with the true scope and spirit of the invention being indicated by the following claims.

The references cited herein, to the extent that they provide exemplary procedural or other details supplementary to those set forth herein, are specifically incorporated by reference.

As used herein and unless otherwise indicated, the terms "a" and "an" are taken to mean "one", "at least one" or "one or more".

What is claimed is:

1. A process of performing a cementing operation in a subterranean zone, comprising:
   placing a cementitious composition into the subterranean zone, the cementitious composition comprising:
   a carrier fluid, and
   a base grind comprising cement clinker interground with zeolite and gypsum wherein the base grind comprises from about 5% to about 95% by weight of zeolite; and
   allowing the cementitious composition to set therein.

2. The process of claim 1 wherein the cementing operation is primary cementing.

3. The process of claim 1 wherein the cementing operation is remedial cementing.

4. The process of claim 1 wherein the base grind comprises from about 10% to about 50% by weight of zeolite.

5. The process of claim 1 wherein the base grind comprises from about 15% to about 45% by weight of zeolite.

6. The process of claim 1 wherein the base grind comprises from about 20% to about 40% by weight of zeolite.

7. The process of claim 1 wherein the base grind further comprises at least one pozzolan selected from the group consisting of fly ash, slag, diatomaceous earth, fumed silica, calcined shale, metakaolin, rice husk ash, natural pozzolan and combinations thereof.

8. The process of claim 7 wherein the base grind comprises from about 10% to about 50% by weight of the pozzolan.

9. The process of claim 7 wherein the base grind comprises at least two pozzolans.

10. The process of claim 7 wherein the base grind comprises at least three pozzolans.

11. The process of claim 1 wherein the zeolite is represented by the formula:

$$M_{a/n}[(AlO_2)_a(SiO_2)_b] \cdot xH_2O$$

where
M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P;
n represents the cation valence;
the ratio of b:a is in a range from greater than or equal to 1 and less than or equal to 5; and
x represents the moles of water entrained into the zeolite framework.

12. The process of claim 1 wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

13. The process of claim 1 wherein the interground base grind has an exterior surface area greater than 10,000 $cm^2$/g.

14. The process of claim 1 wherein the base grind has an exterior surface area of from about 11,000 $cm^2$/g to about 16,000 $cm^2$/g.

15. The process of claim 1 wherein the base grind has an exterior surface area of from about 13,000 $cm^2$/g to about 15,000 $cm^2$/g.

16. The process of claim 1 wherein the carrier fluid comprises a water-based carrier fluid in an amount of from about 0.18 to about 12.0 cubic meters of water-based carrier fluid per metric tonne of base grind.

17. The process of claim 1 wherein the carrier fluid comprises an oil-based carrier fluid.

18. The process of claim 1 wherein the cementitious composition further comprises an additive selected from the group consisting of an accelerator, a retarder, an activator, a defoamer and combinations thereof.

19. The process of claim 16 wherein the additive comprises an accelerator selected from the group consisting of sodium sulfate, sodium carbonate and combinations thereof.

20. The process of claim 1 wherein the cementitious composition further comprises an accelerator in an amount of from about 0.5% to about 10% by weight of the base grind.

21. The process of claim 1 wherein the cementitious composition further comprises an accelerator.

22. The process of claim 1 further comprising foaming the cementitious composition to form a foamed cementitious composition.

23. The process of claim 1 wherein the base grind comprises gypsum at an amount of from greater than 0% to about 10% by weight of clinker.

24. The process of claim 1 wherein the base grind comprises gypsum at an amount of from about 2% to about 7% by weight of clinker.

* * * * *